US012802912B2

(12) United States Patent
Ogawa et al.

(10) Patent No.: US 12,802,912 B2
(45) Date of Patent: Nov. 17, 2026

(54) ELECTROMAGNETIC RELAY

(71) Applicant: OMRON Corporation, Kyoto (JP)

(72) Inventors: Shinichi Ogawa, Kyoto (JP); Ryota Minowa, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 219 days.

(21) Appl. No.: 18/716,148

(22) PCT Filed: Nov. 16, 2022

(86) PCT No.: PCT/JP2022/042464
§ 371 (c)(1),
(2) Date: Jun. 4, 2024

(87) PCT Pub. No.: WO2023/112582
PCT Pub. Date: Jun. 22, 2023

(65) Prior Publication Data

US 2025/0037951 A1 Jan. 30, 2025

(30) Foreign Application Priority Data

Dec. 15, 2021 (JP) ................................ 2021-203440

(51) Int. Cl.
*H01H 50/02* (2006.01)
*H01H 50/36* (2006.01)
*H01H 50/58* (2006.01)

(52) U.S. Cl.
CPC ....... *H01H 50/02* (2013.01); *H01H 2050/028* (2013.01); *H01H 50/36* (2013.01); *H01H 50/58* (2013.01)

(58) Field of Classification Search
CPC ........ H01H 50/02; H01H 50/14; H01H 50/54; H01H 9/02
See application file for complete search history.

(56) References Cited

U.S. PATENT DOCUMENTS

2021/0202197 A1 7/2021 Werner et al.
2022/0406548 A1 12/2022 Werner et al.

FOREIGN PATENT DOCUMENTS

CN 102737914 A * 10/2012
CN 114762072 A * 7/2022 ............ H01H 50/36
(Continued)

OTHER PUBLICATIONS

CN102737914A Machine Translation.*
(Continued)

*Primary Examiner* — Mohamad A Musleh
(74) *Attorney, Agent, or Firm* — SHINJYU GLOBAL IP

(57) ABSTRACT

An electromagnetic relay includes a first fixed terminal, a movable contact piece, a drive device, a contact case, and a housing. The first fixed terminal includes a first fixed contact. The movable contact piece includes a first movable contact facing the first fixed contact in a first direction. The drive device moves the movable contact piece in the first direction. The contact case is arranged side by side with the drive device in the first direction. The contact case accommodates the first fixed contact and the movable contact piece. The housing accommodates the contact case and the drive device. The housing includes a pressing section configured to press the contact case against the drive device.

6 Claims, 4 Drawing Sheets

(56) References Cited

FOREIGN PATENT DOCUMENTS

| | | | | |
|---|---|---|---|---|
| JP | 2018-163761 A | | 10/2018 | |
| JP | 2021-518043 A | | 7/2021 | |
| JP | 2021-144957 A | | 9/2021 | |
| WO | WO-2013153818 A1 | * | 10/2013 | ........... H01H 50/546 |

OTHER PUBLICATIONS

The International Search Report of International Application No. PCT/JP2022/042464 issued on Jan. 24, 2023.
The Written Opinion of the International Searching Authority of International Application No. PCT/JP2022/042464 issued on Jan. 24, 2023.

* cited by examiner

ELECTROMAGNETIC RELAY

CROSS-REFERENCE TO RELATED APPLICATION

This application is the U.S. National Phase of International Application No. PCT/JP2022/042464, filed on Nov. 16, 2022. That application claims priority to Japanese Patent Application No. 2021-203440, filed Dec. 15, 2021. The contents of those two applications are incorporated by reference herein in their entireties.

FIELD

The claimed invention relates to an electromagnetic relay.

BACKGROUND

Conventionally, an electromagnetic relay is known that includes a contact case in which a fixed contact and a movable contact piece are accommodated (see Japanese Patent Application Publication No. 2018-163761). The contact case is fixed to a yoke by means such as brazing or welding.

When the contact case is fixed by means such as brazing or welding, high component precision is required and the manufacturing costs increase.

SUMMARY

An object of the claimed invention is to provide an electromagnetic relay in which a contact case can be fixed at low cost.

An electromagnetic relay according to one aspect of the claimed invention includes a first fixed terminal, a movable contact piece, a drive device, a contact case, and a housing. The first fixed terminal includes a fixed contact. The movable contact piece includes a movable contact that faces the fixed contact in a first direction. The drive device is configured to move the movable contact piece in the first direction. The contact case is arranged side-by-side with the drive device in the first direction. The contact case accommodates the first fixed contact and the movable contact piece. The housing accommodates the contact case and the drive device. The housing includes a pressing section configured to press the contact case against the drive device.

In the electromagnetic relay, the contact case is fixed by being pressed against the drive device by the pressing section of the housing. Thus, the contact case can be fixed at lower cost than a case where the contact case is fixed by means such as brazing or welding. Since the contact case can be fixed simply, the production efficiency of the electromagnetic relay is improved. In addition, compared to the case where the contact case is fixed by means such as welding, high precision of the components is not required. Since the contact case can be fixed using the housing, the number of components can be reduced compared to the case where a separate member is prepared to fix the contact case.

The contact case includes a case-top wall extending in a direction perpendicular to the first direction, a case-side wall disposed laterally relative to (i.e., to the sides of) the movable contact piece and extending in the first direction from the case-top wall toward the drive device, and a to-be-pressed section protruding toward the pressing section to be pressed by the pressing section. In this case, the contact case can be fixed when the pressing section presses the to-be-pressed section.

The top wall of the contact case may be comprised of resin and may support the first fixed terminal. In this case, since the to-be-pressed section is to press a position different from the top wall that supports the first fixed terminal, the first fixed terminal is unlikely to be displaced when the pressing section presses the contact case.

The housing may further include a side wall disposed laterally relative to (i.e., to the sides of) the case-side wall and the drive device. The pressing section of the housing may protrude from the side wall toward the case-side wall. In this case, the side wall of the housing is strengthened by the pressing section.

The pressing section of the housing may have an elasticity to be bendable in the first direction. In this case, assembly of the contact case is facilitated.

The drive device may include a yoke configured to contact the to-be-pressed section of the contact case. In this case, the to-be-pressed section can be supported by the yoke.

The housing may further include a housing body having an opening that is open in a direction extending from the drive device toward the contact case, and a lid configured to close the opening of the housing body. The lid may include the pressing section. In this case, since the pressing section is located on the lid, the contact case can be fixed with a simple configuration.

The contact case may include a case-top wall extending in a direction perpendicular to the first direction, and a case-side wall disposed laterally relative to (i.e., to the sides of) the movable contact piece and extending in the first direction from the case-top wall toward the drive device. The housing may further include a top wall facing the case-top wall in the first direction. The top wall of the housing may include the pressing section. In this case, the contact case can be fixed by the top wall of the housing.

The pressing section may press a vicinity of a boundary between the case-top wall and the case-side wall. In this case, the pressing section can stably press the to-be-pressed section.

The pressing section may be arranged at a position overlapping the case-side wall in the first direction. In this case, the pressing section can further stably press the to-be-pressed section.

The top wall of the contact case may be comprised of resin and may support the first fixed terminal. In this case, since the to-be-pressed section is to press a vicinity of the case-side wall, the first fixed terminal is unlikely to be displaced when the pressing section presses the contact case.

The housing may further include a housing body that has an opening, the opening being open in a direction extending from the drive device to the contact case, and a lid configured to close the opening of the housing body. The lid may include the top wall. In this case, the contact case can be fixed with a simple configuration.

The electromagnetic relay may further include a second fixed terminal that includes a second fixed contact. The movable contact piece may further include a second movable contact that faces the second fixed contact in the first direction. In this case, the contact case can be fixed simply in an electromagnetic relay that includes a second fixed terminal.

DETAILED DESCRIPTION

Figure 1:
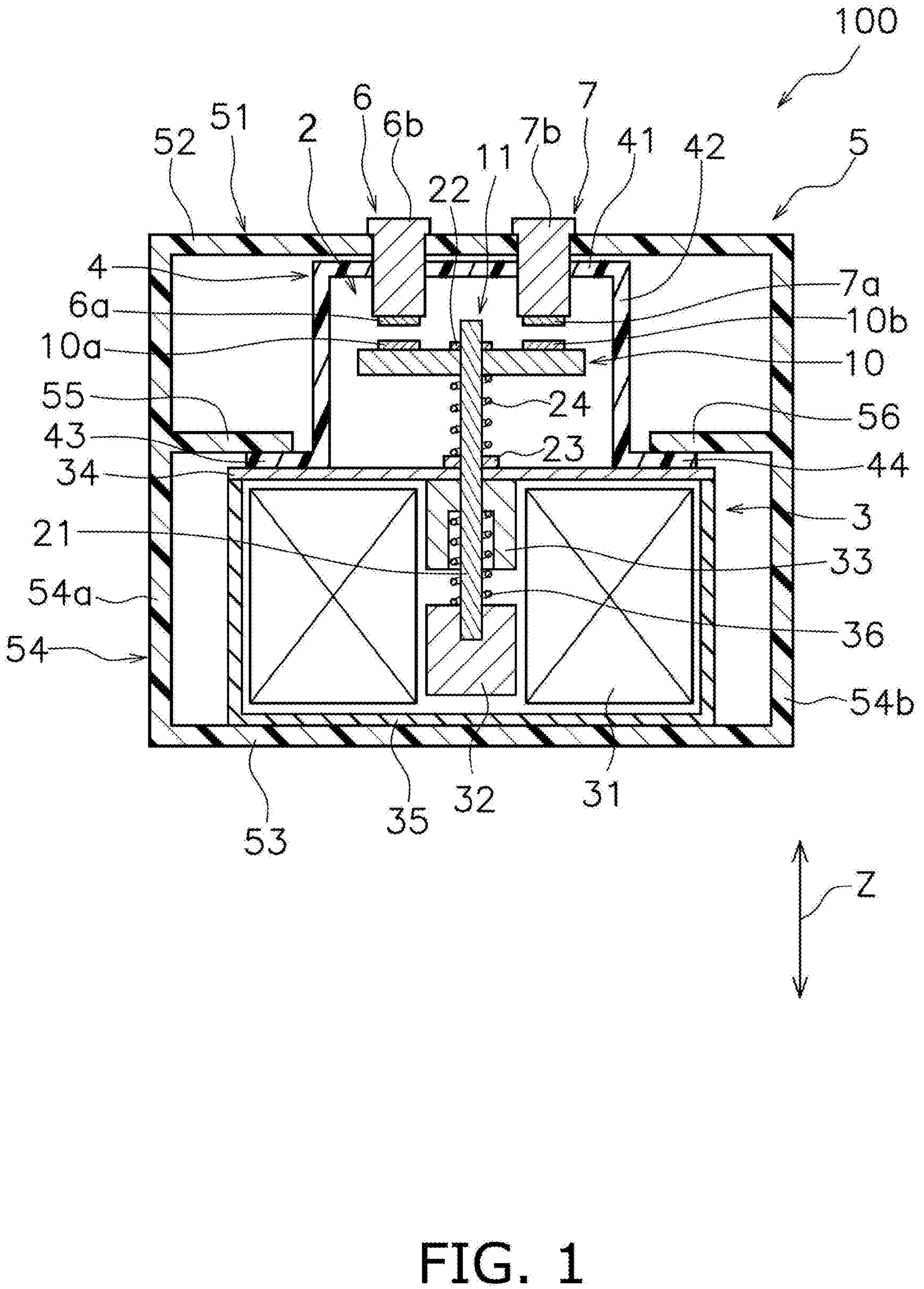
FIG. 1 is a cross-sectional view of an electromagnetic relay in accordance with the claimed invention.

Hereinafter, one embodiment of an electromagnetic relay 100 according to one aspect of the claimed invention will be described with reference to the drawings. When referring to the drawings, for easier understanding of the description, the upper side in FIG. 1 will be referred to as "upper", the lower side as "lower", the left side as "left", and the right side as "right". In addition, a direction perpendicular to the paper plane of FIG. 1 will be described as a front-rear direction. The up-down direction in the present embodiment is an example of a first direction Z. These directions are defined for convenience of description, and do not limit the directions in which the electromagnetic relay 100 is arranged.

FIG. 1 is a cross-sectional view of the electromagnetic relay 100. As illustrated in FIG. 1, the electromagnetic relay 100 includes a contact device 2, a drive device 3, a contact case 4, and a housing 5.

The contact device 2 includes a first fixed terminal 6, a second fixed terminal 7, a movable contact piece 10, and a movable mechanism 11.

The first fixed terminal 6 and the second fixed terminal 7 are columnar and extend in the up-down direction. The first fixed terminal 6 and the second fixed terminal 7 are spaced apart from each other in the left-right direction. The first fixed terminal 6 and the second fixed terminal 7 are comprised of conductive material such as copper.

The first fixed terminal 6 includes a first fixed contact 6*a* and a first external connection 6*b*. The first fixed contact 6*a* is comprised of conductive material such as copper. The first fixed contact 6*a* is arranged on the lower surface of the first fixed terminal 6, within the contact case 4. The first fixed contact 6*a* may be integrated with the first fixed terminal 6. The first external connection 6*b* protrudes upward from the housing 5 and is exposed to the outside of the housing 5.

The second fixed terminal 7 is arranged apart from the first fixed terminal 6 in the left-right direction. The second fixed terminal 7 is arranged to the right of the first fixed terminal 6. The second fixed terminal 7 includes a second fixed contact 7*a* and a second external connection 7*b*. The second fixed contact 7*a* is comprised of conductive material such as copper. The second fixed contact 7*a* is arranged on the lower surface of the second fixed terminal 7, within the contact case 4. The second fixed contact 7*a* may be integral with the second fixed terminal 7. The second external connection 7*b* protrudes upward from the housing 5 and is exposed to the outside of the housing 5.

The movable contact piece 10 is a plate member that is elongated in one direction, and is comprised of conductive material such as copper. The movable contact piece 10 is accommodated in the contact case 4. The movable contact piece 10 is arranged below the first fixed contact 6*a* and the second fixed contact 7*a*. The movable contact piece 10 has a dimension in the left-right direction that is larger than a dimension thereof in the front-rear direction. That is, in the present embodiment, the longitudinal direction of the movable contact piece 10 coincides with the left-right direction. The transverse direction of the movable contact piece 10 coincides with the front-rear direction.

The movable contact piece 10 is arranged so as to be movable in the direction in which a first movable contact 10*a* contacts the first fixed contact 6*a* (here, upward) and in the direction in which the first movable contact 10*a* separates from the first fixed contact 6*a* (here, downward). That is, in the present embodiment, the movable contact piece 10 is arranged to be movable in the up-down direction.

The movable contact piece 10 includes the first movable contact 10*a* and a second movable contact 10*b*. The first movable contact 10*a* faces the first fixed contact 6*a* in the up-down direction. The first movable contact 10*a* is arranged below the first fixed contact 6*a* and is configured to come into contact with the first fixed contact 6*a* as the movable contact piece 10 moves. The second movable contact 10*b* faces the second fixed contact 7*a* in the up-down direction. The second movable contact 10*b* is arranged below the second fixed contact 7*a* and is configured to come into contact with the second fixed contact 7*a* as the movable contact piece 10 moves. The first movable contact 10*a* and the second movable contact 10*b* may be integral with the movable contact piece 10.

The movable mechanism 11 includes a drive shaft 21, a first holding member 22, a second holding member 23, and a contact spring 24. The drive shaft 21 is connected to the movable contact piece 10. The drive shaft 21 extends in the up-down direction and passes through the movable contact piece 10 in the up-down direction. The drive shaft 21 is arranged to be movable in the up-down direction.

The first holding member 22 is fixed to the drive shaft 21 above the movable contact piece 10. The second holding member 23 is fixed to the drive shaft 21 below the movable contact piece 10. The contact spring 24 is arranged between the movable contact piece 10 and the second holding member 23. The contact spring 24 urges the movable contact piece 10 upward via the second holding member 23.

The drive device 3 is arranged below the contact device 2. The drive device 3 is fixed to the housing 5. The drive device 3 uses electromagnetic force to move the movable contact piece 10 in the up-down direction via the drive shaft 21 of the movable mechanism 11. The drive device 3 includes a coil 31, a movable iron core 32, a fixed iron core 33, a first yoke 34, a second yoke 35, and a return spring 36.

When excited by application of a voltage, the coil 31 generates an electromagnetic force that moves the movable iron core 32 upward. The movable iron core 32 is connected to the drive shaft 21 so as to be integrally movable therewith. The fixed iron core 33 is arranged at a position facing the movable iron core 32. The fixed iron core 33 is arranged above the movable iron core 32. The drive shaft 21 passes through the fixed iron core 33 in the up-down direction. The drive shaft 21 is movable in the up-down direction relative to the fixed iron core 33.

The first yoke 34 is an example of a yoke. The first yoke 34 extends in a direction perpendicular to the up-down direction and has a rectangular shape when viewed from above. The first yoke 34 is arranged between the contact case 4 and the coil 31. The first yoke 34 covers the coil 31 from above. The first yoke 34 is connected to the fixed iron core 33. The first yoke 34 is fixed to the housing 5.

The second yoke 35 has a U-shape when viewed from the front-rear direction. The second yoke 35 is arranged around the coil 31 and is connected to the first yoke 34. The second yoke 35 covers the coil 31 from left and right sides and from below. The second yoke 35 is fixed to the housing 5.

The return spring 36 is disposed between the movable iron core 32 and the fixed iron core 33 and urges the movable iron core 32 in a direction away from the fixed iron core 33 (here, downward).

The operations of the contact device 2 and drive device 3 are the same as conventional ones, so the description is omitted.

The contact case 4 has a substantially rectangular, box shape and is comprised of insulating material. In the present embodiment, the contact case 4 is comprised of resin. It should be noted that the contact case 4 may be comprised of ceramic or metal.

The contact case 4 is arranged side-by-side with (i.e., adjacent to) the drive device 3 in the up-down direction. In the present embodiment, the contact case 4 is disposed above the drive device 3. The contact case 4 accommodates the first fixed contact 6*a*, the second fixed contact 7*a*, and the movable contact piece 10.

The contact case 4 includes a top wall 41 and a side wall 42. The top wall 41 is an example of the case-top wall, and the side wall 42 is an example of the case-side wall. The top wall 41 and the side wall 42 constitute the outer walls of the contact case 4. The top wall 41 and the side wall 42 define a space that accommodates the first fixed contact 6*a*, the second fixed contact 7*a*, and the movable contact piece 10.

The top wall 41 extends in a direction perpendicular to the up-down direction. The top wall 41 is arranged above the movable contact piece 10 and supports the first fixed terminal 6 and the second fixed terminal 7. The first fixed terminal 6 and the second fixed terminal 7 pass through the top wall 41 in the up-down direction.

The side wall 42 is laterally arranged relative to the movable contact piece 10, i.e., the side wall 42 is arranged to the front, rear, left, and right sides of the movable contact piece 10. The side wall 42 is connected to the top wall 41. The side wall 42 extends from the top wall 41 toward the first yoke 34 of the drive device 3 in the up-down direction. The side wall 42 has a lower end that is in contact with the upper surface of the first yoke 34 of the drive device 3. The contact case 4 is open downward. The contact case 4 is closed at the bottom by, for example, a bottom wall member (not shown) that is a separate member from the contact case 4.

The contact case 4 includes a first to-be-pressed section 43 and a second to-be-pressed section 44. The first to-be-pressed section 43 and the second to-be-pressed section 44 protrude from the side wall 42 toward the housing 5 in a direction perpendicular to the up-down direction. The first to-be-pressed section 43 and the second to-be-pressed section 44 protrude from the lower end of the side wall 42 toward the outside of the contact case 4. The first to-be-pressed section 43 and the second to-be-pressed section 44 are arranged in contact with the upper surface of the first yoke 34. The first to-be-pressed section 43 protrudes to the left from the lower left end of the side wall 42. The second to-be-pressed section 44 protrudes to the right from the lower right end of the side wall 42.

The housing 5 has a substantially rectangular, box shape and is comprised of insulating material. In the present embodiment, the housing 5 is comprised of resin. The housing 5 accommodates the drive device 3 and the contact case 4.

The housing 5 includes a housing body 51 and a lid (not shown). The housing body 51 is open to the front. During assembly of the electromagnetic relay 100, the contact device 2, the contact case 4, and the drive device 3 are inserted into the housing body 51 from the front. The opening of the housing body 51 is then closed by the lid.

The housing 5 includes a top wall 52, a lower wall 53, and a side wall 54. The top wall 52, the lower wall 53, and the side wall 54 constitute the outer walls of the housing 5. In the present embodiment, the housing body 51 includes the top wall 52, the lower wall 53, and the side wall 54. The top wall 52 and the lower wall 53 both extend in a direction perpendicular to the up-down direction and have a rectangular shape when viewed from above. The top wall 52 is arranged above the contact case 4. The lower wall 53 is arranged below the drive device 3 and restricts the downward movement of the drive device 3.

The side wall 54 is disposed between the top wall 52 and the lower wall 53 and is connected to the top wall 52 and the lower wall 53. The side wall 54 includes a left wall 54*a*, a right wall 54*b*, and a rear wall (not shown). The left wall 54*a* and the right wall 54*b* extend in a direction perpendicular to the left-right direction, i.e., fore and aft. The left wall 54*a* is arranged to the left of the contact case 4 and the drive device 3. The right wall 54*b* is arranged to the right of the contact case 4 and the drive device 3. The rear wall is arranged behind the contact case 4 and the drive device 3.

The housing 5 includes a first pressing section 55 and a second pressing section 56. The first pressing section 55 and the second pressing section 56 are elastically flexible in the up-down direction. The first pressing section 55 and the second pressing section 56 are positioned within the housing 5.

The first pressing section 55 and the second pressing section 56 press and fix the contact case 4 against the drive device 3. Specifically, the first pressing section 55 presses the first to-be-pressed section 43 of the contact case 4 downward, against the first yoke 34 of the drive device 3. The second pressing section 56 presses the second to-be-pressed section 44 of the contact case 4 downward, against the first yoke 34 of the drive device 3. This configuration allows the contact case 4 to be fixed to (i.e., held or secured against) the drive device 3.

In the embodiment illustrated in FIG. 1, the first pressing section 55 is a rib that protrudes to the right of the inner surface of the left wall 54*a* of the side wall 54. The first pressing section 55 extends from the inner surface of the left wall 54*a* to a position overlapping the first to-be-pressed section 43 in the up-down direction. The second pressing section 56 is a rib that protrudes to the left of the inner surface of the right wall 54*b* of the side wall 54. The second pressing section 56 extends from the inner surface of the right wall 54*b* to a position overlapping the second to-be-pressed section 44 in the up-down direction. Here, the first pressing section 55 and the first to-be-pressed section 43 are in surface contact, but the first pressing section 55 and the first to-be-pressed section 43 may be in point contact with each other. The same configuration applies to that between the second pressing section 56 and the second to-be-pressed section 44.

In the electromagnetic relay 100 with the above configuration, the contact case 4 is pressed and fixed against the drive device 3 by the first pressing section 55 and the second pressing section 56 of the housing 5. Thus, compared to the situation where the contact case 4 is fixed by means such as brazing and welding, the contact case 4 can be fixed at lower cost. Since the contact case 4 can be fixed simply, the production efficiency of the electromagnetic relay 100 is improved. Furthermore, compared to the case where contact case 4 is fixed by means such as welding, high component precision is not required.

One embodiment of the electromagnetic relay according to one aspect of the claimed invention has been described above. The claimed invention, however, is not limited to the above embodiment, and various changes can be made without departing from the scope of the claimed invention.

The configurations of the first fixed terminal 6 and the second fixed terminal 7 may be changed. The first fixed terminal 6 and the second fixed terminal 7 may have a C-shaped curved shape. Alternatively, the first fixed terminal 6 and the second fixed terminal 7 may be plate terminals. For example, the first fixed terminal 6 may protrude leftward from the left wall 54*a* of the housing 5, and the second fixed terminal 7 may protrude rightward from the right wall 54*b* of the housing 5.

The configurations of the contact device 2 and the drive device 3 may be changed. For example, a configuration is possible in which the movable contact piece 10 is arranged above the first fixed terminal 6 and the second fixed terminal 7 and the fixed iron core 33 is arranged below the movable iron core 32.

The configurations of the first pressing section 55 and the second pressing section 56 may be changed. That is, the configurations of the contact case 4 and the housing 5 may be changed. The top wall 41 of the contact case 4 may be a separate member from the side wall 42. The contact case 4 may include a bottom wall that is integral with the side wall 42.

The first pressing section 55 and the second pressing section 56 only need to have shapes configured to press the first to-be-pressed section 43 and the second to-be-pressed section 44 against the drive device 3. The first pressing section 55 and the second pressing section 56 may protrude downward from the inner surface of the top wall 52 of the housing 5. Further, the first to-be-pressed section 43 and the second to-be-pressed section 44 may be arranged apart from the first yoke 34 in the up-down direction.

The second pressing section 56 may be omitted. In that case, for example, the contact case 4 may be comprised of ceramic, and the first pressing section 55 may be arranged at the center of the top wall 41 of the contact case 4. Furthermore, three or more pressing sections may be formed with which the housing 5 presses the contact case 4 against the drive device 3.

Figure 2:
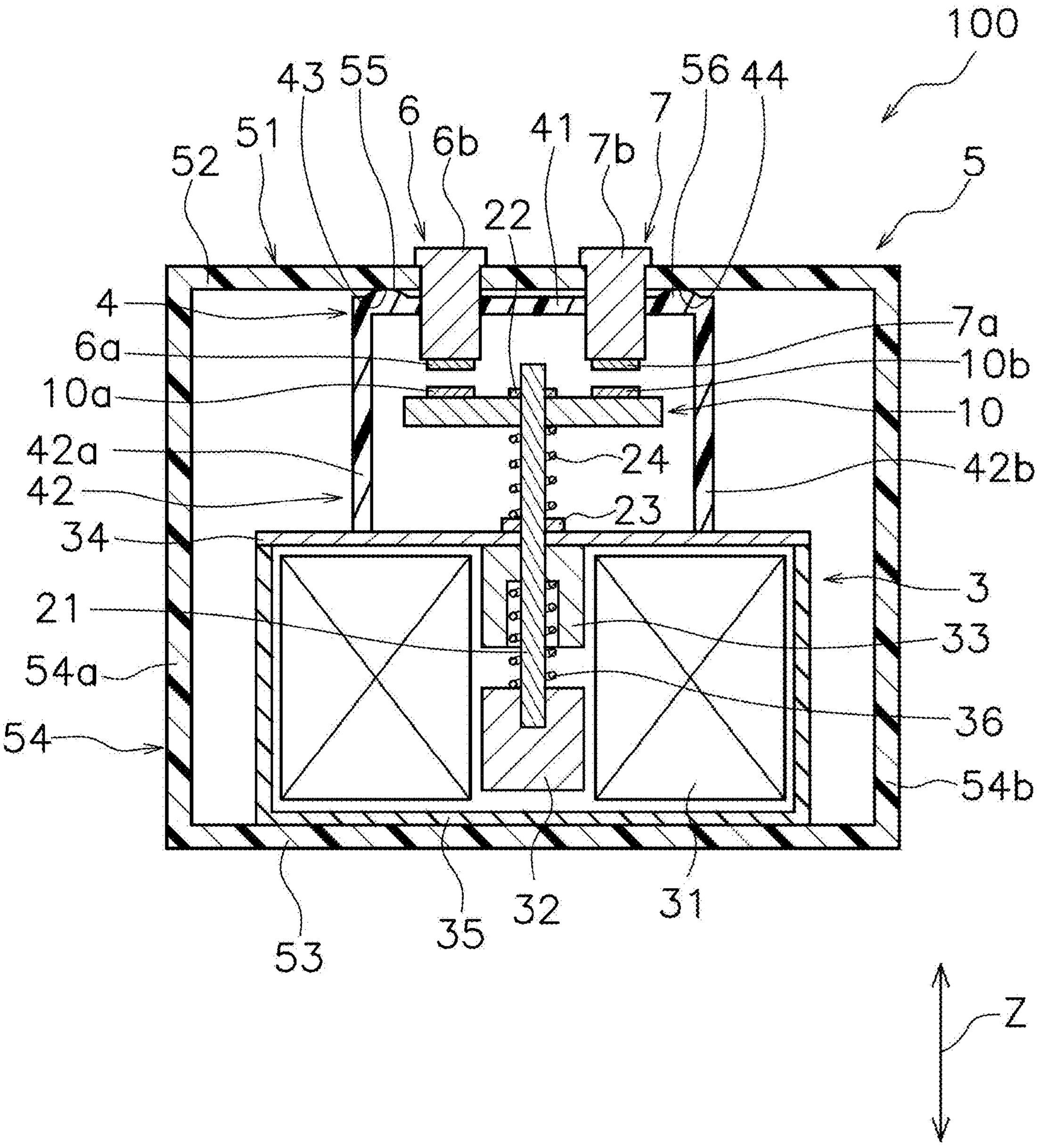
FIG. 2 is a cross-sectional view of an electromagnetic relay according to one modification.

FIG. 2 is a diagram illustrating a modification of the first pressing section 55 and the second pressing section 56. As illustrated in FIG. 2, the first pressing section 55 and the second pressing section 56 may be arranged on the top wall 52 of the housing 5. In the modification of FIG. 2, the first pressing section 55 and the second pressing section 56 are formed by part of the inner surface of the top wall 52 of the housing 5. The first to-be-pressed section 43 and the second to-be-pressed section 44 are arranged on the upper surface of the top wall 41 of the contact case 4. The first to-be-pressed section 43 and the second to-be-pressed section 44 have a convex shape protruding toward the top wall 52 of the housing 5. It should be noted that the first to-be-pressed section 43 and the second to-be-pressed section 44 may be formed by flat surfaces and that the first pressing section 55 and the second pressing section 56 may have a convex shape protruding toward the first to-be-pressed section 43 and the second to-be-pressed section 44.

The first pressing section 55 and the second pressing section 56 are configured to press in the vicinity of the boundary between the top wall 41 and the side wall 42. The first pressing section 55 and the second pressing section 56 are arranged at positions overlapping the side wall 42 in the up-down direction. In the example of FIG. 2, the first pressing section 55 is arranged at a position overlapping the left wall 42*a* of the side wall 42 in the up-down direction. The second pressing section 56 is arranged at a position overlapping the right wall 42*b* of the side wall 42 in the up-down direction.

Figure 3:
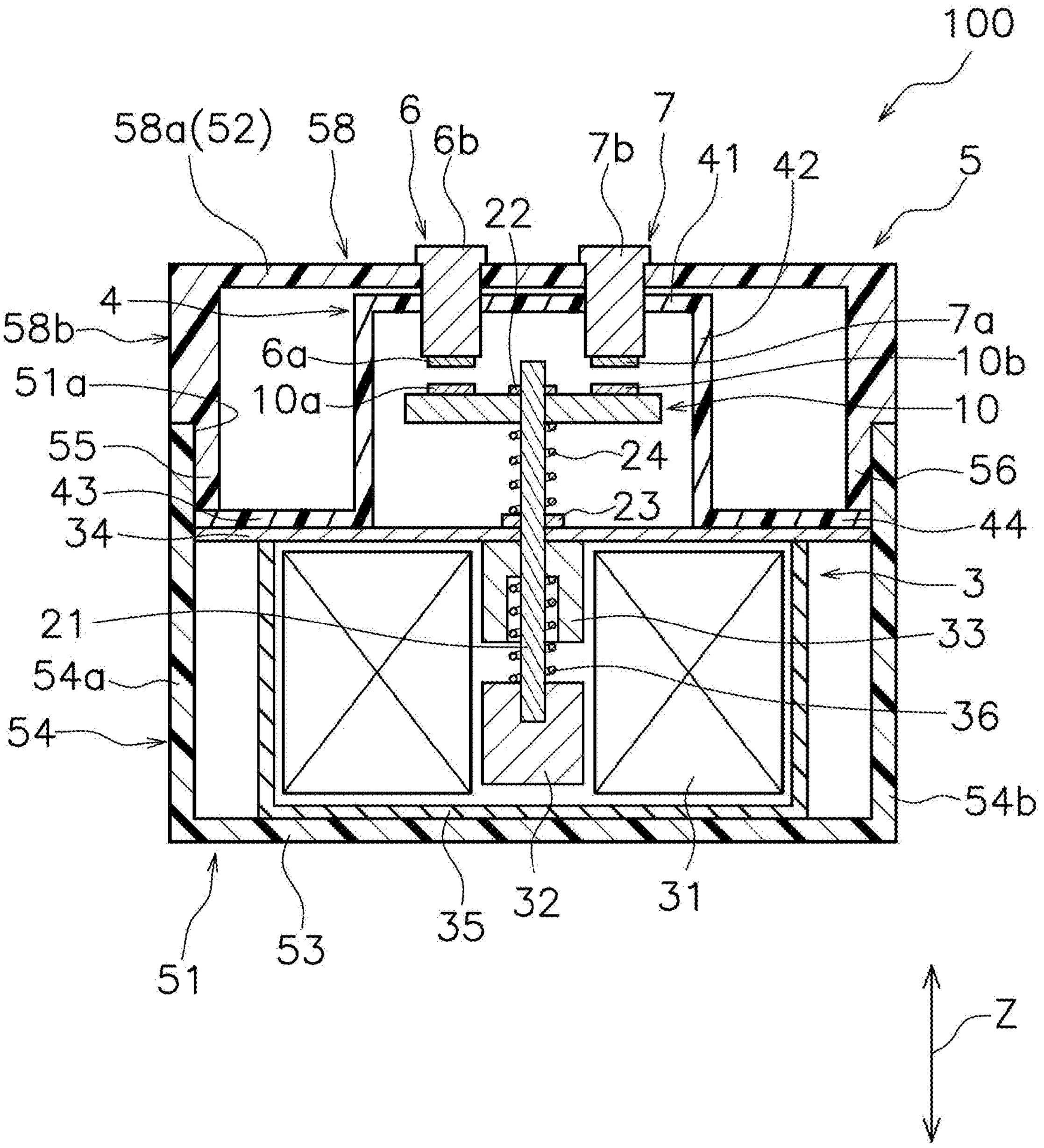
FIG. 3 is a cross-sectional view of an electromagnetic relay according to another modification.
Figure 4:
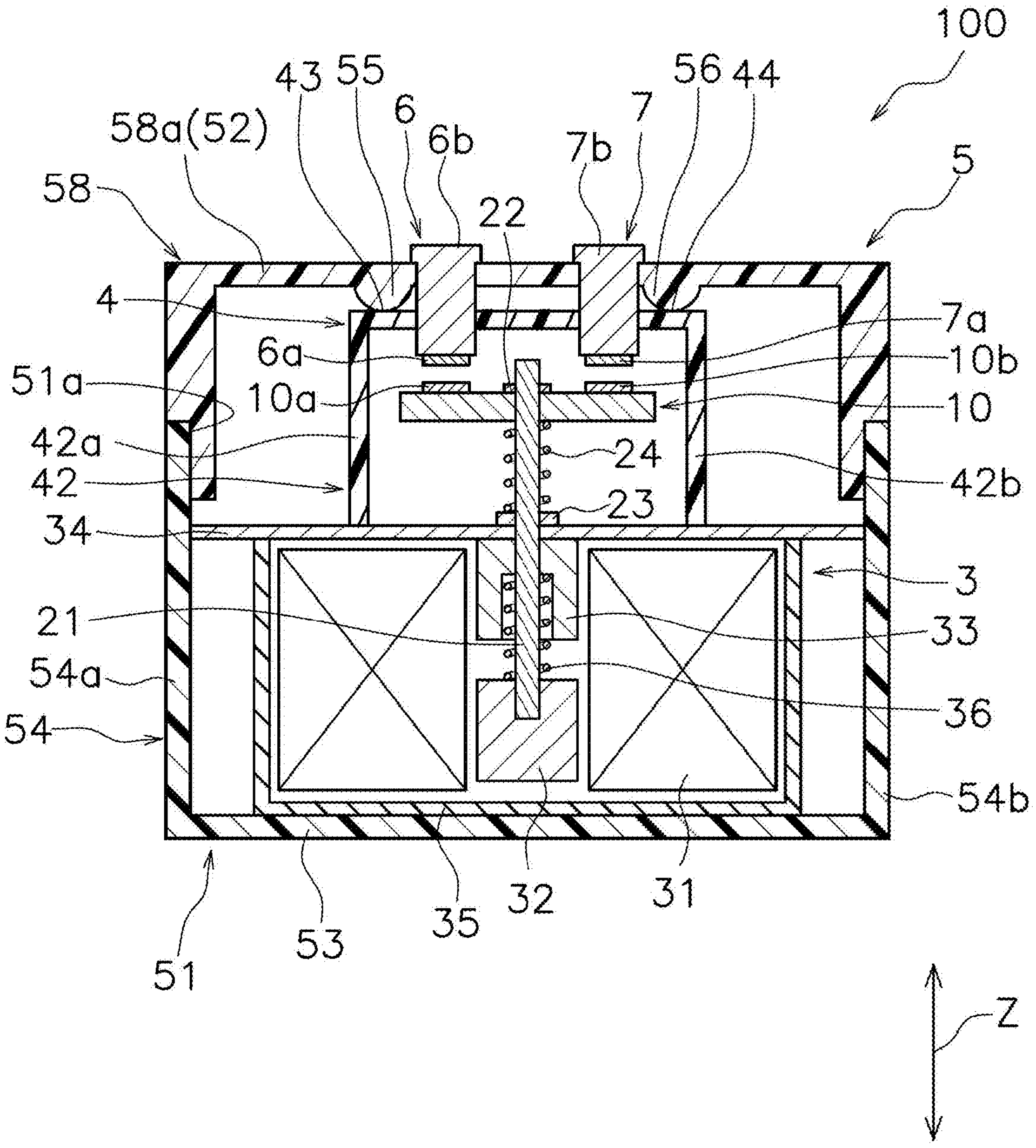
FIG. 4 is a cross-sectional view of an electromagnetic relay according to yet another modification.

FIGS. 3 and 4 are each a diagram illustrating a modification of the housing 5. As illustrated in FIGS. 3 and 4, the housing body 51 of the housing 5 may have an opening 51*a* that is open in a direction (in this case, upward) from the drive device 3 toward the contact case 4. The first to-be-pressed section 43 and the second to-be-pressed section 44 may press the contact case 4 against the drive device 3 by the lid 58 of the housing 5. That is, as illustrated in FIGS. 3 and 4, the first pressing section 55 and the second pressing section 56 may be located on the lid 58.

The lid 58 is attached to the upper part of the housing body 51 so as to close the opening 51*a* of the housing body 51. The lid 58 may be fixed to the housing body 51 by, for example, a snap-fit connection. The contact device 2, the contact case 4, and the drive device 3 are inserted into the housing body 51 from above. The lid 58 constitutes a part of the side wall 54 of the housing 5.

In the example of FIG. 3, the first to-be-pressed section 43 and the second to-be-pressed section 44 protrude toward the outside of the contact case 4 from the lower end of the side wall 42, as in the above embodiment. The first pressing section 55 protrudes downward from a side wall 58*b* of the lid 58 toward the first to-be-pressed section 43, and the second pressing section 56 protrudes downward from the side wall 58*b* of the lid 58 toward the second to-be-pressed section 44.

In the example of FIG. 4, as in the modification illustrated in FIG. 2, the first pressing section 55 and the second pressing section 56 are arranged on a top wall 58*a* of the lid 58 (i.e., the top wall 52 of the housing 5), and the first to-be-pressed section 43 and the second to-be-pressed section 44 are arranged on the upper surface of the top wall 41 of the contact case 4. The first pressing section 55 and the second pressing section 56 have a convex shape, and they protrude toward the first to-be-pressed section 43 and the second to-be-pressed section 44, respectively.

REFERENCE NUMERALS

3: drive device, 4: contact case, 41: Top wall (Example of case-top wall), 42: Side wall (Example of case-side wall), 5: Housing, 51: Housing body, 51*a*: Opening, 52: Top wall, 54: Side wall, 55: First pressing section (Example of pressing section), 56: Second pressing section (Example of pressing section), 58: Lid, 6: First fixed terminal, 6*a*: First fixed contact, 7: Second fixed terminal, 7*a*: Second fixed contact, 10: Movable contact piece, 10*a*: First movable contact, 10*b*: Second movable contact, 100: Electromagnetic relay, Z: First direction

The invention claimed is:

1. An electromagnetic relay, comprising:

a first fixed terminal including a fixed contact;

a movable contact piece including a movable contact facing the fixed contact in a first direction;

a drive device configured to move the movable contact piece in the first direction;

a contact case arranged adjacent to the drive device in the first direction and in contact therewith, the contact case accommodating the first fixed contact and the movable contact piece; and a housing including a pressing section configured and arranged to press the contact case against the drive device, the housing accommodating the contact case and the drive device, wherein the contact case includes a case-top wall extending in a direction perpendicular to the first direction, a case-side wall disposed to sides of the movable contact piece, the case-side wall extending in the first direction from the case-top wall toward the drive device, and a to-be-pressed section protruding from the case-side wall toward the housing, the to-be-pressed section configured and arranged to be pressed by the pressing section.

2. The electromagnetic relay according to claim 1, wherein the case-top wall is comprised of resin and supports the first fixed terminal.

3. The electromagnetic relay according to claim 1, wherein the housing further includes a side wall disposed to sides of the case-side wall and the drive device, and the pressing section of the housing protrudes from the side wall toward the case-side wall.

4. The electromagnetic relay according to claim 3, wherein the pressing section of the housing is elastically flexible in the first direction.

5. The electromagnetic relay according to claim 1, wherein the drive device includes a yoke configured to contact the to-be-pressed section of the contact case.

6. The electromagnetic relay according to claim 1, further comprising:

a second fixed terminal including a second fixed contact, wherein the movable contact piece further includes a second movable contact facing the second fixed contact in the first direction.

* * * * *